United States Patent
Goh et al.

(10) Patent No.: US 6,581,168 B1
(45) Date of Patent: Jun. 17, 2003

(54) METHOD AND APPARATUS FOR AUTOMATIC RECEIVE VERIFICATION

(75) Inventors: Joon K. Goh, Singapore (SG); Boon Piaw Tan, Singapore (SG); L. S. Chua, Singapore (SG)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/531,895

(22) Filed: Mar. 21, 2000

Related U.S. Application Data

(60) Provisional application No. 60/173,481, filed on Dec. 29, 1999.

(51) Int. Cl.$^7$ .............................................. G06F 11/00
(52) U.S. Cl. .......................................... 714/43; 710/47
(58) Field of Search .............................. 714/43, 44, 45, 714/48, 56, 39, 25, 27, 30, 712, 46; 710/15, 18, 52, 47

(56) References Cited

U.S. PATENT DOCUMENTS

| | | | | |
|---|---|---|---|---|
| 5,025,458 A | * | 6/1991 | Casper et al. ............... 375/114 |
| 5,379,289 A | * | 1/1995 | DeSouza et al. .......... 370/85.13 |
| 5,434,872 A | * | 7/1995 | Petersen et al. ............ 371/57.1 |
| 5,664,105 A | * | 9/1997 | Keisling et al. ........ 395/200.54 |
| 6,105,079 A | * | 8/2000 | Kuo et al. ..................... 710/25 |
| 6,154,796 A | * | 11/2000 | Kuo et al. ..................... 710/52 |
| 6,401,142 B1 | * | 6/2002 | Williams et al. ............... 710/14 |
| 6,408,423 B1 | * | 6/2002 | Khou et al. ..................... 716/4 |

* cited by examiner

Primary Examiner—Nadeem Iqbal

(57) ABSTRACT

A method and apparatus for automatically verifying whether a network interface is receiving frame data properly. A network interface and a received data checker receive frame data from a network media such as a network or a network model. The network interface processes and transmits the frame data to host memory for storage. The host memory stores the frame data and transmits the frame data to the receive data checker. The receive frame checker compares the frame data from the host memory with the frame data from the network media and generates an indicator signal. The indicator signal indicates whether the network interface is receiving frame data properly. The indicator signal is sent to a display which displays the result.

13 Claims, 4 Drawing Sheets

| Figure 1A |
| Figure 1B |

METHOD AND APPARATUS FOR AUTOMATIC RECEIVE VERIFICATION

RELATED APPLICATIONS

This application claims priority from U.S. Provisional Application No. 60/173,481, filed Dec. 29, 1999, which is incorporated herein by reference.

TECHNICAL FIELD

The present invention relates to a method and apparatus for automatic receive verification, and more specifically for automatically determining if a network interface is receiving data properly.

BACKGROUND ART

After manufacturing a network interface on a chip, the network interface needs to be tested to ensure that the network interface is receiving, processing and transmitting frame data properly. Typically, testing the receiving aspect of a network interface is accomplished by monitoring the frame data being received by the network interface from a network media such as a network or a network model and comparing the received frame data to a golden file. A golden file is a file containing known results for the received frame data.

Comparing received frame data to a golden file is time consuming and difficult. Often, problems are encountered when the received frame data and the frame data in the golden file are not properly matched or aligned, causing unnecessary errors. In order to ensure accuracy of the testing process, the received frame data must be compared to the proper frame data in the golden file. Often, this comparison requires an experienced Ethernet user who knows Ethernet protocol and can properly align the received frame data and the frame data in the golden file for testing.

Using golden files for data reception testing is also very limited and inflexible because only known frame data can be tested. In other words, the network interface can only test and verify receive frame data in which there is a golden file. As a result, testing is limited to the test parameters of the golden files. Any variance in the size of the frames, order of the frames, type of data, etc. from the known test parameters in the golden file produces errors. Therefore, testing is driven by the parameters of the golden files.

SUMMARY OF THE INVENTION

There is a need for an automatic receive data checker system which can automatically verify whether a network interface is receiving frame data properly and efficiently.

There is also a need for an automatic data checker system which is flexible and allows for testing of unknown frame data, i.e., frame data that is not limited to frame data having a golden file. There is also a need for an automatic receive data checker system to provide an indication when a network interface is not receiving data and operation information properly. There is also a need for an automatic receive data checker system which can dynamically check and verify received frame data after a portion of the frame data has been transferred to host memory.

These and other needs are attained by the present invention, where an automatic receive data checker system is able to automatically and efficiently determine if a network interface is receiving data and operation information properly.

According to one aspect of the present invention, an automatic receive data checker system comprises a network media, a host memory, a network interface and a receive data checker for verifying whether a network interface is receiving frame data properly. Frame data from the network media is received by the network interface and the receive data checker. For testing purposes, the network media is typically a network or a network model. The network interface transmits the received frame data to the host memory. The host memory stores the frame data from the network interface and provides the frame data to the receive data checker. The receive data checker compares the frame data from the network media with the frame data from the host memory. The result of this comparison is then displayed on a display device. The automatic receive data checker system is dynamic and flexible since the receive data checker is able to compare unknown frame data from the network media. The automatic receive data checker is not limited to testing frame data having a golden file.

Another aspect of the present invention provides a method for determining if a network interface is receiving frame data properly. The method comprises the following steps: A network interface and receive data checker receiving frame data from a network media. The network interface providing the frame data to host memory. The host memory storing the frame data and providing the frame data to the receive data checker. The receive data checker storing the frame data from the network media in receive data checker memory. The receive data checker comparing the frame data from the host memory with the frame data in the receive data checker memory. The receive data checker generating an indicator signal indicating whether the network interface is receiving frame data properly. A display device displaying the result of the comparison in response to receiving the indicator signal. This method allows for automatic and efficient testing of a network interface.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention is described in the context of an IEEE 802.3 compliant network interface configured for sending and receiving data packets between a system memory and a network medium using established Media Access Control (MAC) and Physical Layer (PHY) protocols. An overview will first be provided of the network interface, followed by a description of the arrangement for automatically determining if a network interface is receiving data and operation information properly.

Network Interface Overview

Figures 1, 1A:
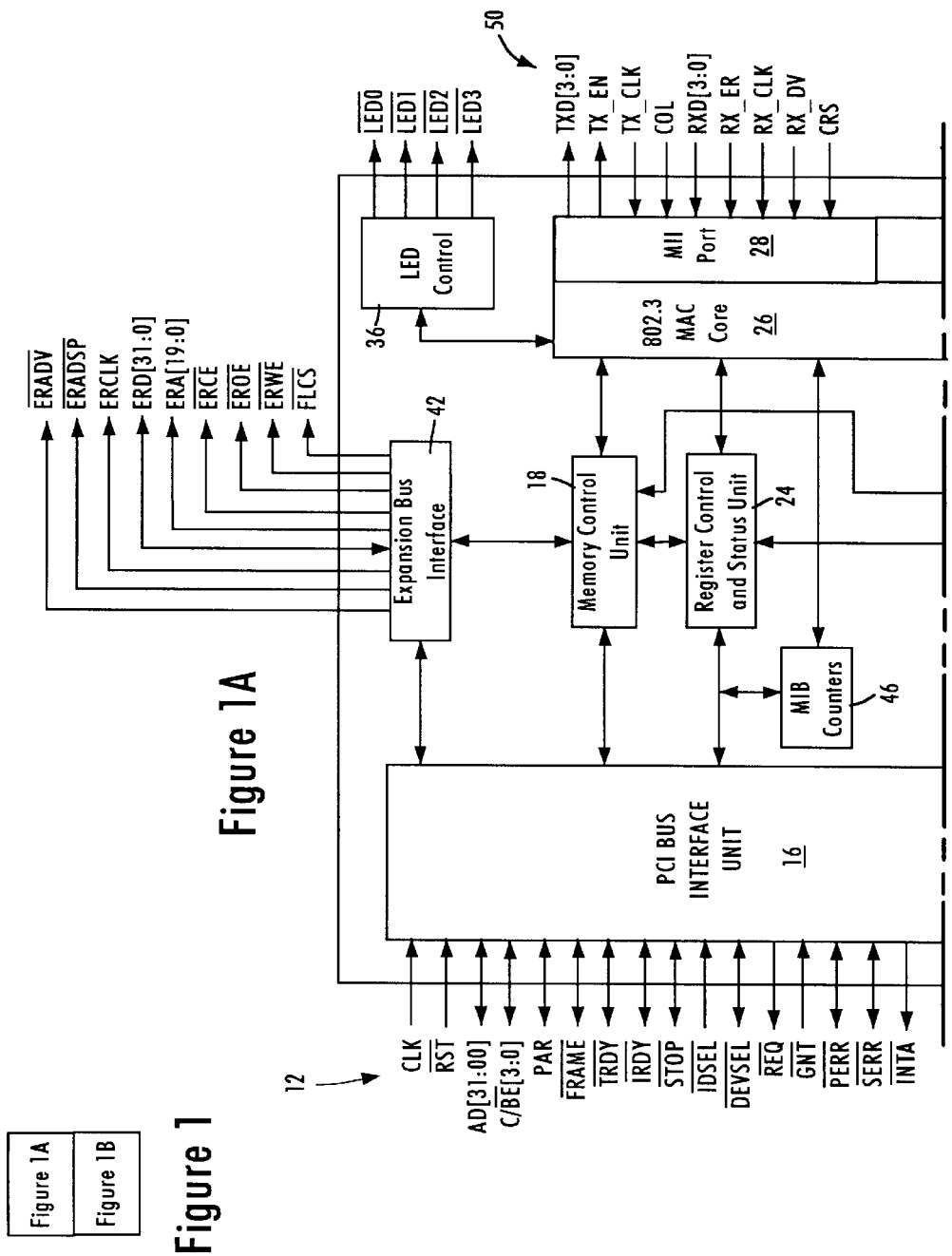
FIG. 1 is a block diagram of an exemplary network interface that accesses the media of an Ethernet network according to an embodiment of the present invention.
Figure 1B:
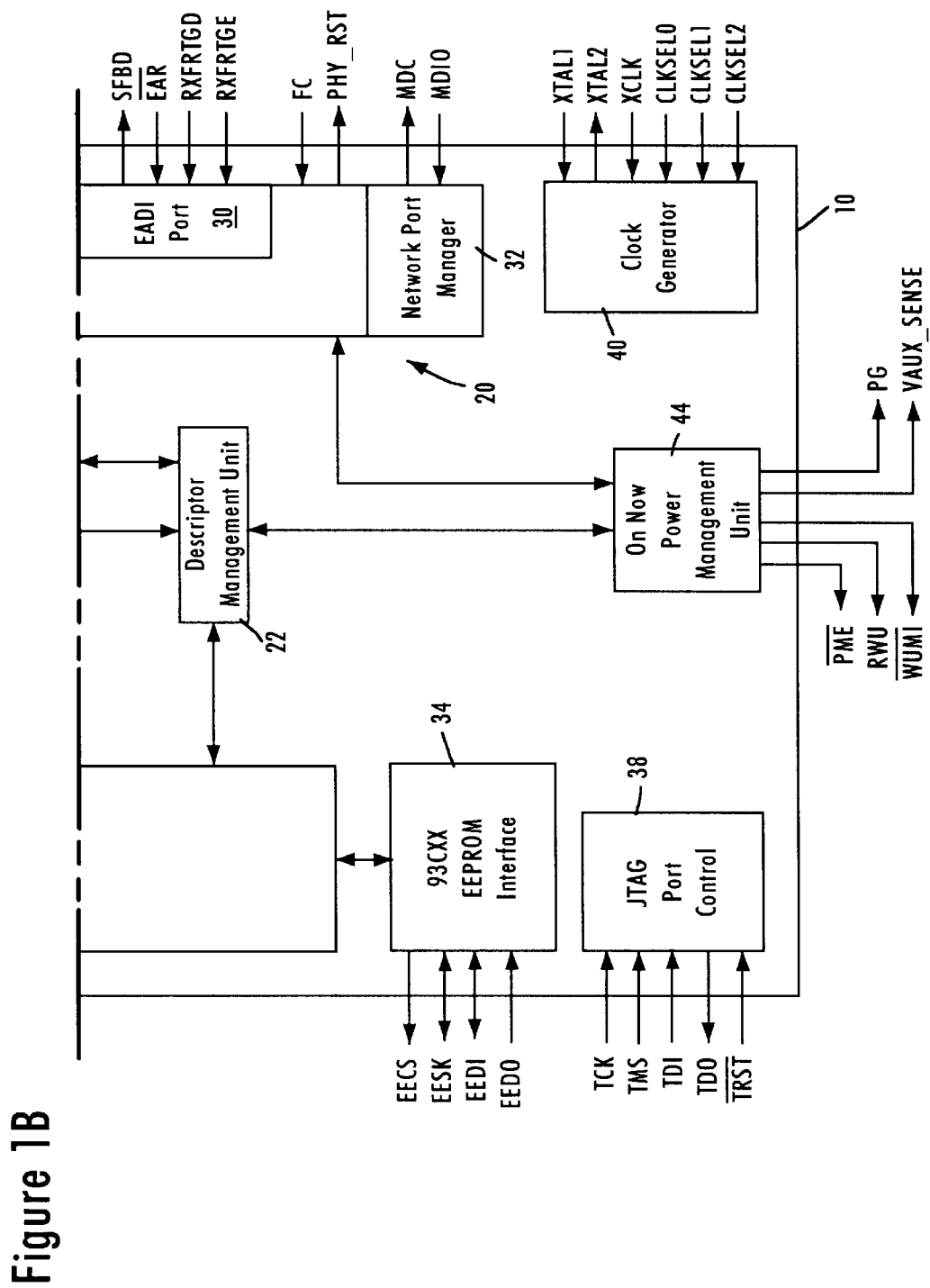

FIG. 1 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10 Mb/s, 100 Mb/s or 1000 Mb/s transceivers, an External Address Detection Interface (EADI) port 30, and a network port manager unit 32. The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a host computer memory via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit 18 retrieves the receive data from the data memory and passes it to the PCI bus interface unit 16 for transfer to the host computer via the PCI bus 12.

The descriptor management unit 22 manages the transfers of data to and from the host computer via the PCI bus interface unit 16. Data structures contained in the memory of the host computer specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

Figure 2:
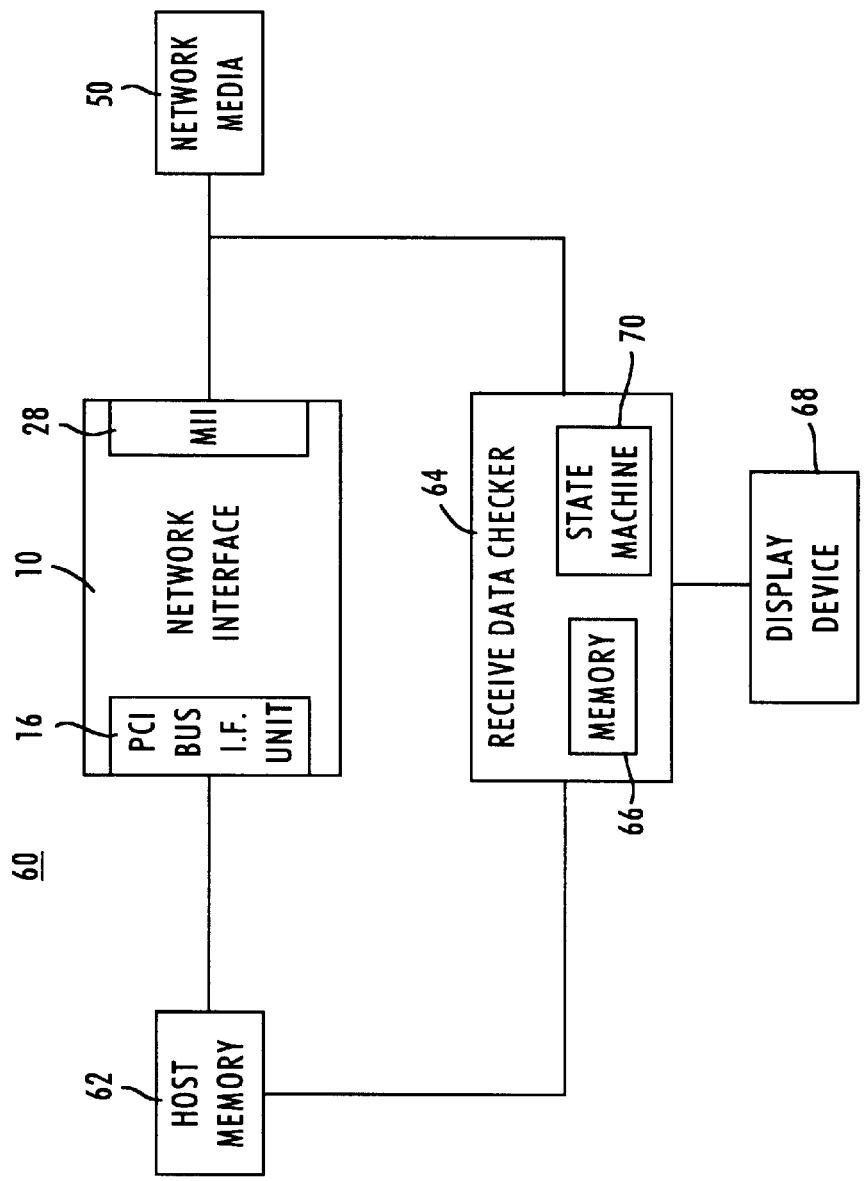
FIG. 2 is a block diagram illustrating an exemplary arrangement of a receive data checker system.

FIG. 2 is a block diagram illustrating an exemplary arrangement of a receive data checker system in accordance with the present invention. The receive data checker system 60 comprises host memory 62, a network interface 10, and a receive data checker 64. The network interface 10 and the receive data checker 64 receive frame data from a network media. As used herein, the term frame data is defined as frame data and the operation information associated with the frame data. The operation information includes descriptors and other information necessary to be make the frame data IEEE 802.3 compliant. For testing purposes, the network media 50 is either a network or a network model.

The network interface 10 receives the frame data via the MII ports 28. The network interface 10 then processes and transmits the frame data via the PCI interface unit 16 to the host memory 62. The host memory 62 stores the frame data. Once the host memory 62 receives a complete frame, the host memory 62 provides the frame data to the receive data checker 64. This receiving of frame data by the network interface 10 is in conformance with conventional arrangements.

In the arrangement of the present invention, the receive data checker 64 also receives the frame data from the network media 50 and stores the frame data in the receive data checker memory 66.

The receive data checker 64 includes a state machine 70 which monitors the connection between the network media 50 and the network interface 10. The state machine 70 automatically samples the data or signals at the MII ports 28 to determine if the data or signals are frame data. Specifically, the state machine 70 recognizes or detects (e.g., filters) the required receive Ethernet 802.3 frame data and checks the operation information to ensure that it meets the Ethernet specifications. If the frame data is valid the state machine 70 stores the frame data in the receive data checker memory 66.

The receive data checker 64 automatically compares the frame data from the host memory 62 with the frame data stored in the receive data checker memory 66. The comparison determines if the network interface 10 is receiving the frame data from the network media 50 properly. Based on the comparison, the receive data checker 64 generates an indicator signal which indicates whether the network interface 10 is receiving frame data properly. A display device 68 displays the result of the comparison in response to receiving the indicator signal. Typically, the result of the comparison is either a pass or fail type of indication.

Therefore, the receive data checker 64 compares frame data received from the network interface 10 with the frame data received from the host memory 62, i.e., the frame data processed by and received from the network interface 10. This comparison determines if the network interface 10 is processing received frame data properly without having to use a golden file for the comparison. Since the present invention does not use a golden file, the receive data checker is not limited to testing only frame data having a golden file.

Figure 3:
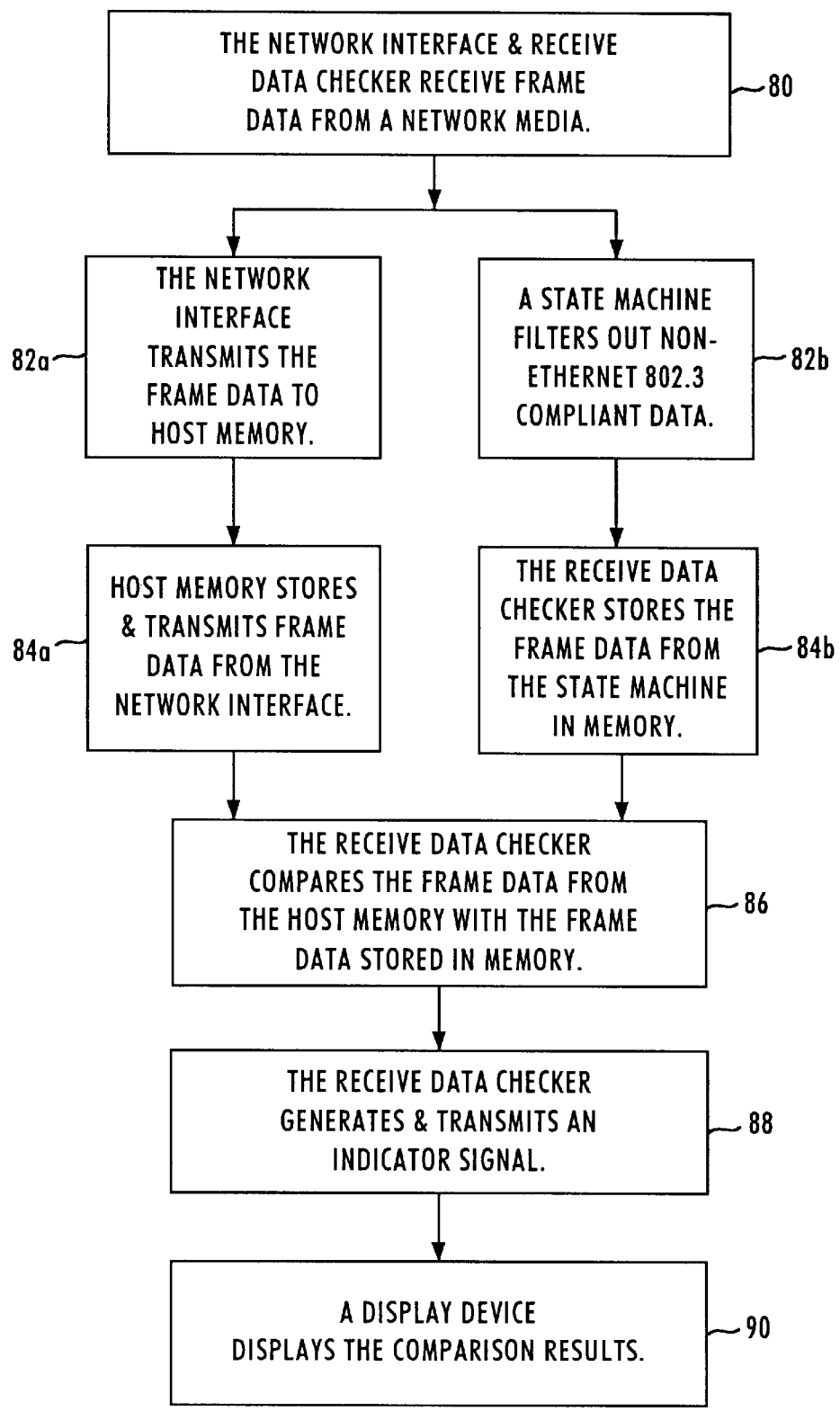
FIG. 3 is a flow chart of a method for determining whether a network interface is receiving data properly.

FIG. 3 is a flow chart of a method for determining whether a network interface is receiving data properly. The method starts with the network interface 10 and receive data checker 64 receiving frame data being and operation information from a network media 50 at step 80. The network interface 10 receives and processes the frame data and then transmits the frame data to the host memory 62 at step 82*a*. The host memory stores the frame data and transmits the frame data to the receive data checker 64 at step 84*b*.

A state machine 70 samples and filters the frame data from the network media 50 in order to filter and discard data that is not Ethernet 802.3 compliant at step 82*b*. The receive data checker 64 then stores the frame data in receive data checker memory 66 at step 84*b*. The frame data that is being stored is either from the state machine 70 or directly from the network media 50. The receive data checker compares the frame data from the host memory 62 with the frame data stored in receive data checker memory 66 at step 86. The receive data checker 64 generates an indicator signal indicating whether the network interface 10 is receiving frame data properly at step 88. A display device 68 displays the comparison result in response to receiving the indicator signal at step 90.

The use of a receive data checker that receives frame data from a network media for comparison to received frame data from a host memory (i.e., frame data which was received by a network interface) advantageously avoids problems associated with cycle shifts and response time differences associated with prior art systems. Also, a more universal checking can be performed on the network interface outside of the confines imposed by a golden file.

While this invention has been described in connection with what is presently considered to be the most practical and preferred embodiments, it is to be understood that the invention is not limited to the disclosed embodiments, but, on the contrary, is intended to cover various modifications and equivalent arrangements included within the scope of the appended claims.

We claim:

1. A receive data checker system comprising:
   a network interface configured for receiving frame data from network media;
   a host memory coupled to the network interface and configured for storing the frame data from the network interface and transmitting the frame data; and
   a receive checker coupled separately to the host memory and to the network media and configured for receiving the frame data from the host memory and the frame data from the network media and determining if the network interface is processing received frame data properly by comparing the frame data from the host memory with the frame data from the network media.

2. The receive data checker system of claim 1, wherein the network media is a network or a network model.

3. The receive data checker system of claim 1, wherein the receive data checker further comprises receive data checker memory configured for storing the frame data from the network media.

4. The receive data checker system of claim 3, wherein the receive data checker further comprises a state machine that filters the frame data from the network media and stores the frame data from the network media in the receive data checker memory when the frame data is Ethernet 802.3 compliant.

5. The receive data checker system of claim 3, wherein the receive data checker is configured to compare the frame data in the receive data checker memory with the frame data from the host memory.

6. The receive data checker system of claim 5, wherein the receive data checker is further configured to generate and transmit an indicator signal indicating if the network interface is receiving frame data properly.

7. The receive data checker system of claim 6, further comprising a display device coupled to the receive data checker for displaying the result of the comparison in response to receiving the indicator signal.

8. A method for determining whether a network interface is receiving frame data properly, comprising:
   receiving frame data by a network interface from network media;
   receiving the frame data by a host memory from the network interface;
   receiving the frame data by a receive data checker from the network media;
   receiving the frame data by the receive data checker from the host memory;
   comparing the received frame data from the network media with the frame data from the host memory; and
   determining if the network interface is processing received frame data properly based on the result of the comparison.

9. The method of claim 8, further comprising generating an indicator signal indicating the result of the comparison of the frame data from the network interface and the frame data from the host memory.

10. The method of claim 9, further comprising displaying the result of the comparison in response to the indicator signal.

11. The method of claim 8, further comprising filtering data from the network media and storing the frame data that is Ethernet 802.3 compliant.

12. The method of claim 11, further comprising:
   comparing the stored frame data with the frame data from the host memory;
   determining if the network interface is receiving frame data properly based on the comparison; and
   generating an indicator signal indicating the result of the comparison of the stored frame data with the frame data from the host memory.

13. The method of claim 12, further comprising displaying the result of the comparison in response to the indicator signal.

* * * * *